United States Patent
Pos

(10) Patent No.: US 7,866,748 B2
(45) Date of Patent: Jan. 11, 2011

(54) CHILD SEAT FOR A MOTOR VEHICLE

(75) Inventor: Martin Pos, Bayreuth (DE)

(73) Assignee: Cybex Industrial, Ltd., Hong Kong (CN)

( * ) Notice: Subject to any disclaimer, the term of this patent is extended or adjusted under 35 U.S.C. 154(b) by 0 days.

(21) Appl. No.: 12/404,735

(22) Filed: Mar. 16, 2009

(65) Prior Publication Data

US 2009/0174239 A1 Jul. 9, 2009

Related U.S. Application Data

(63) Continuation of application No. 11/832,524, filed on Aug. 1, 2007, now Pat. No. 7,533,933.

(51) Int. Cl.
*B60N 2/26* (2006.01)
*A47C 7/36* (2006.01)

(52) U.S. Cl. .................. 297/256.1; 297/250.1; 297/408

(58) Field of Classification Search ............. 297/250.1, 297/256.1, 256.13, 408, 230.14, 357
See application file for complete search history.

(56) References Cited

U.S. PATENT DOCUMENTS

| | | | | |
|---|---|---|---|---|
| 2,310,346 A | * | 2/1943 | Bell ........................... 248/408 |
| 2,411,063 A | * | 11/1946 | Scott .......................... 297/357 |
| 2,869,622 A | * | 1/1959 | Petersen et al. ............. 297/396 |
| 3,594,040 A | * | 7/1971 | Monroe ...................... 297/257 |
| 3,784,253 A | | 1/1974 | Kohler et al. |
| 3,838,870 A | * | 10/1974 | Hug ............................ 297/472 |
| 5,195,770 A | * | 3/1993 | Ishikura ...................... 280/648 |
| 5,810,445 A | | 9/1998 | Surot |
| 6,199,947 B1 | | 3/2001 | Wiklund |
| 6,250,716 B1 | | 6/2001 | Clough |
| 6,273,509 B1 | | 8/2001 | Reithmeier et al. |
| 6,378,950 B1 | | 4/2002 | Takamizu et al. |
| 6,467,846 B2 | | 10/2002 | Clough |
| 6,715,827 B1 | * | 4/2004 | Chen ........................... 297/148 |
| 6,896,326 B2 | * | 5/2005 | Chen ...................... 297/256.13 |
| 7,040,705 B2 | | 5/2006 | Clough |
| 2003/0132588 A1 | | 7/2003 | Senger |
| 2003/0173804 A1 | | 9/2003 | Fisher et al. |

FOREIGN PATENT DOCUMENTS

| | | |
|---|---|---|
| DE | 7338951 U1 | 1/1974 |
| DE | 3536206 A1 | 4/1987 |
| DE | 3931436 A1 | 4/1991 |
| DE | 4034120 A1 | 10/1991 |

(Continued)

OTHER PUBLICATIONS

International Search Report; Mar. 13, 2009; 6 pages.

*Primary Examiner*—Sarah B McPartlin
(74) *Attorney, Agent, or Firm*—Quarles & Brady LLP

(57) ABSTRACT

Child seat for motor vehicles with a seat shell and backrest, at the upper end of which a head support (10) with lateral wings (11) projecting towards the front is disposed. The inclination of the head support (10), at least of a headrest (12) disposed between the two lateral wings (11) of the same, can be adjusted relative to the backrest (arrows 13, 14), in particular, between an upright, waking position "W" extending approximately parallel to the backrest and a resting or sleeping position "S" inclined towards the rear.

10 Claims, 4 Drawing Sheets

FOREIGN PATENT DOCUMENTS

| | | |
|---|---|---|
| DE | 9206122 U1 | 7/1992 |
| DE | 68903571 T2 | 4/1993 |
| DE | 4328635 C1 | 9/1994 |
| DE | 4333855 C2 | 4/1995 |
| DE | 19548339 A1 | 6/1997 |
| DE | 19611588 C2 | 9/1997 |
| DE | 69808973 T2 | 8/2003 |
| EP | 0113645 A2 | 7/1984 |
| EP | 1084900 A2 | 3/2001 |
| EP | 1336531 A2 | 8/2003 |
| FR | 2816558 A3 | 11/2001 |
| GB | 1200626 A | 7/1970 |
| JP | S53145625 U | 11/1978 |
| WO | 0040433 A1 | 7/2000 |
| WO | 2004000602 A1 | 12/2003 |

\* cited by examiner

CHILD SEAT FOR A MOTOR VEHICLE

CROSS-REFERENCE TO RELATED PATENT APPLICATIONS

This patent application is a continuation of U.S. patent application Ser. No. 11/832,524, filed Aug. 1, 2007, now U.S. Pat. No. 7,533,933, which claims priority to U.S. patent application Ser. No. 11/143,318, filed on Jun. 2, 2005, which is now issued as U.S. Pat. No. 7,275,792, which claims priority to German Patent Application No. 10 2004 039 204.8, filed Aug. 12, 2004, and German Patent Application No. 10 2004 046 163.5, filed Sep. 23, 2004. The entire disclosure of each of the foregoing patent applications are hereby incorporated by reference herein.

FIELD OF THE INVENTION

The invention relates to a child seat for motor vehicles, with a seat shell and backrest, at the upper end of which is disposed a head support with lateral wings projecting towards the front.

Child seats of this kind are widely known. They are generally attached to a rear seat or the passenger seat of a motor vehicle by means of the safety belt provided in the motor vehicle. An extremely diverse range of designs is available for this purpose; in this context, reference is made to DE 43 28 635 C2 only by way of example.

The present invention is concerned with the provision of increased comfort and increased safety for the child. In this context, child seats, which can be tilted from an upright position into an inclined sleeping position and vice versa are already known. However, these are relatively complicated designs, the construction of which is correspondingly heavy. Moreover, there is the danger, that in the event of a sudden braking of the vehicle, the child could slip forward from the sleeping position, under the safety belt, especially under the waist belt. In this case, there is also especially a risk that the child could be strangled or seriously injured by the diagonal belt. To prevent this, it is imperative that so-called five-point safety harnesses are used with child seats of this kind.

Especially for the weight class from 15 kg to 36 kg (approximately 3.5 to 12 years), child seats, which are held together with the child by the in-vehicle seat belts, are used as an alternative to the above-named child seats. The backrests of these child seats are generally connected to the seat component in a rigid manner. Many designs also provide backrests, which can be rotated on the seat component about a horizontal axis, so that they can be adapted to the inclination of the vehicle backrest and allow a resting position inclined towards the rear for the child.

In most cases, head supports are additionally fitted onto the backrest by plug-in connection. The height of such head supports can be adjusted to the size of the child's body. These head supports generally provide side wings for lateral support and to prevent injuries to the head in the event of a side-on collision. The disadvantage with this design is that no measures are provided to prevent the child's head from tilting forwards if the child falls asleep with the associated relaxation of the neck muscles. In this context, there is also a slight shift in the balance of the upper body as a whole towards the front with the consequence that this also slumps forward. If a side-on collision occurs under such conditions, the child is practically without support, in particular, the lateral wings of the head support are no longer effective.

In the event of a head-on collision, the slumped-forward upper body will generally have slipped out of and/or over the diagonal belt. In this case also, the upper body is largely unprotected.

The present invention is based upon the object of providing a child seat for motor vehicles, which guarantees a high level of comfort with a minimum complexity of design and increased safety for the child by comparison with the prior art.

This object is achieved according to the invention by the characterizing features of claim 1. Design details and further developments of the invention are described in the dependent claims.

The essence of the present invention is therefore that the head support and/or head rest can be moved from an upright waking position into a resting or sleeping position inclined towards the rear, in order to prevent the head and possibly the entire upper body of a sleeping child from slumping forward out of the seat structure and to prevent the upper body from twisting free from the diagonal belt. The safety of the child, for example, in the event of a side-on or head-on collision, remains at an unchanged, high level.

The inclination of the head support and/or of the headrest disposed between the two lateral wings of the same can preferably be adjusted either infinitely or stepwise. This is ultimately a question of the expenditure, which the manufacturer wishes to invest in the design.

It is also of essential importance, that the head support is mounted on the backrest in a height-adjustable manner. For this purpose, the head support is preferably disposed at the upper end of a head-support holder mounted in a height-adjustable manner on the backrest, which can be tubular in design or in the form of a plank. In the case of a plank-like design of the head-support holder, a wedge-shaped recess is preferably formed between the two lateral wings, into which the headrest disposed between the lateral wings can be rotated. The rotational bearing for the headrest is preferably disposed at the lower end of the same adjacent to the seat shell.

Further design details of the rotational bearing and of the measures for positioning the head support and/or headrest are described in greater detail in claims 8 and following.

A preferred embodiment of a head support designed according to the invention will be described in greater detail below with reference to the attached drawings. The drawings are as follows.

Figure 1:
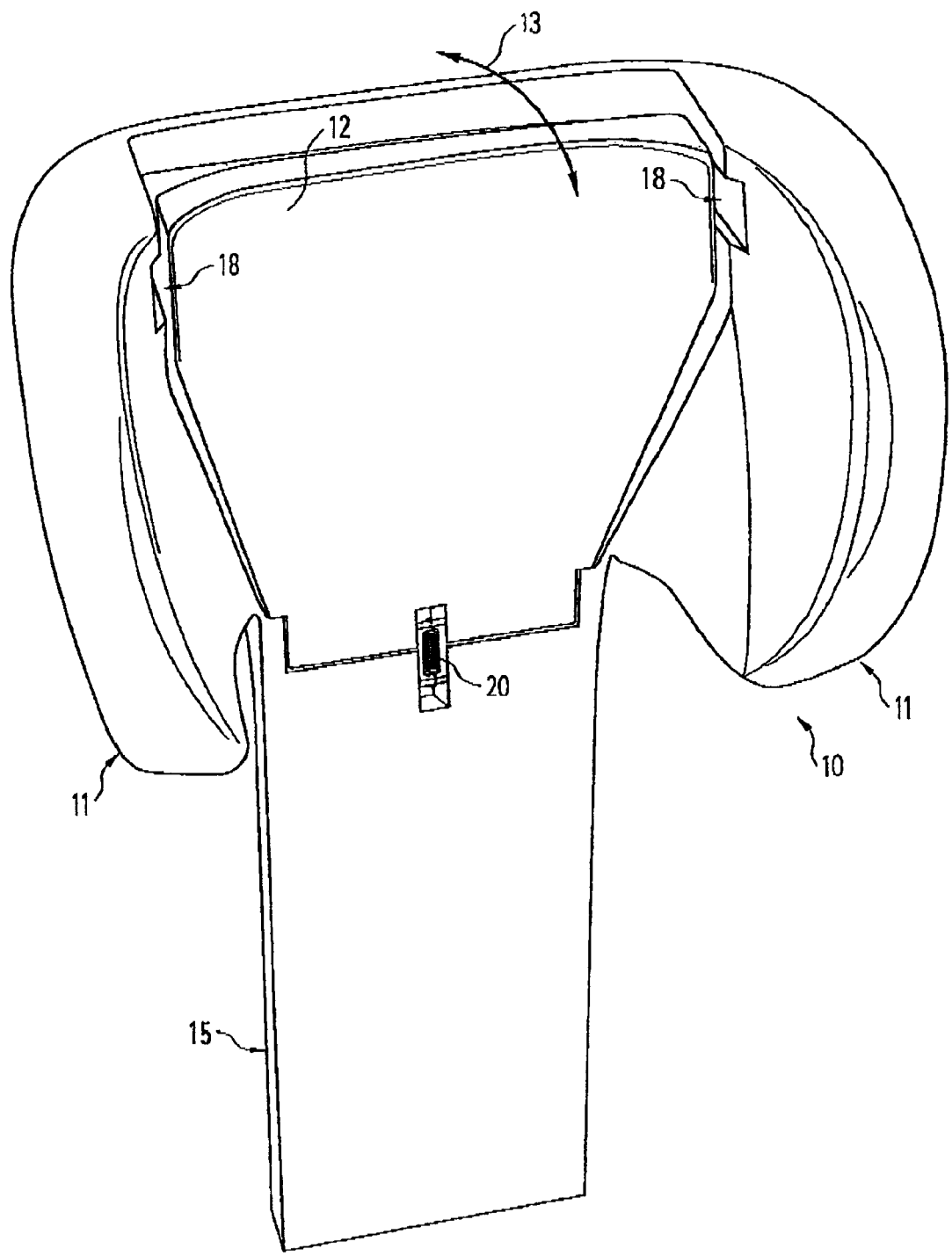
FIG. 1 shows in a perspective front view a head-support structure designed according to the invention.
Figure 2:
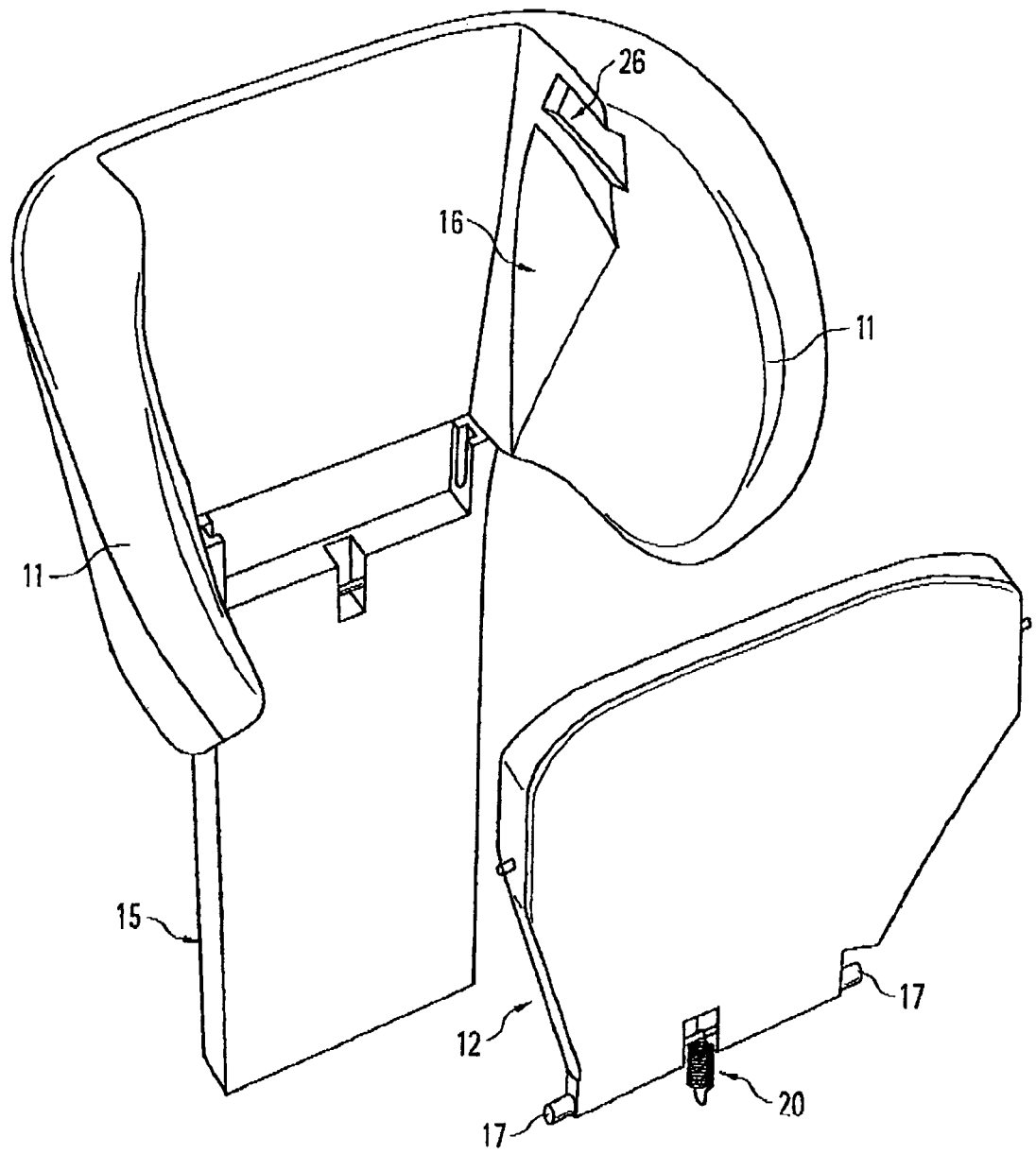
FIG. 2 shows in an exploded perspective view the head-support structure according to FIG. 1.
Figure 3:
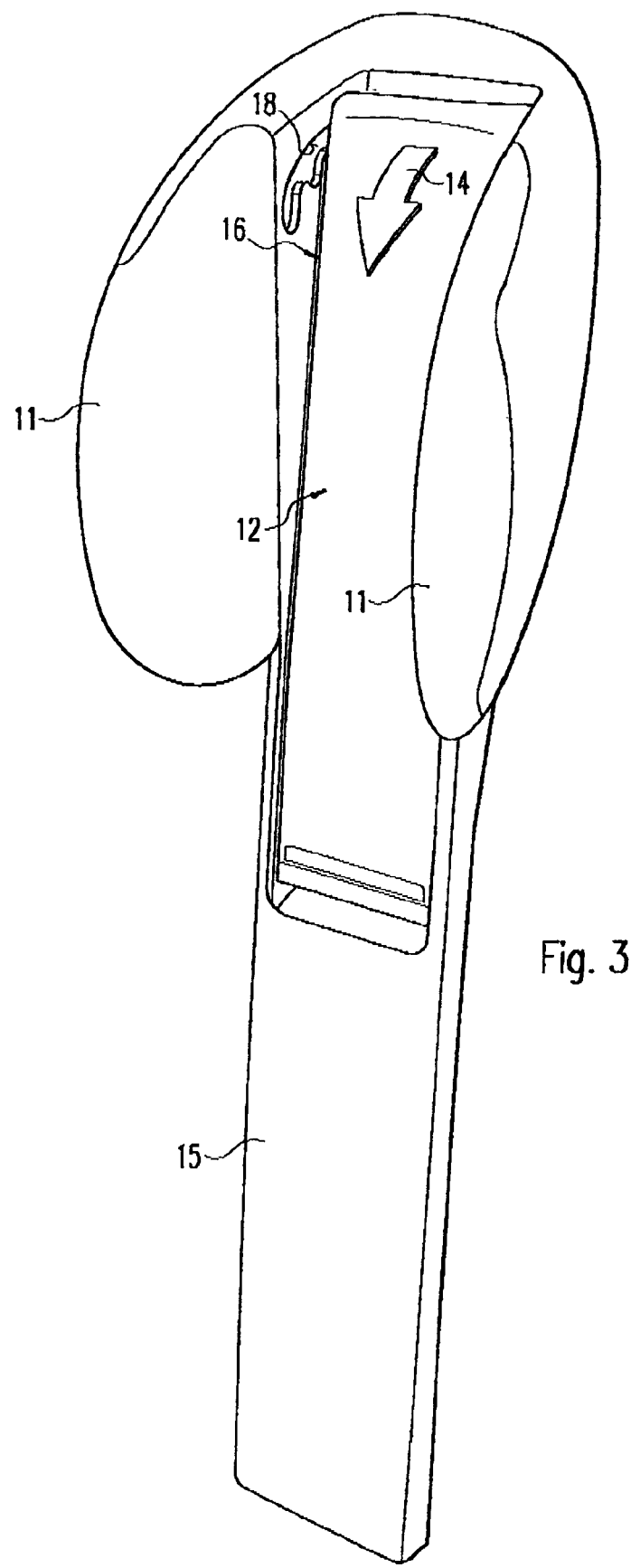
FIG. 3 shows a perspective view corresponding to FIG. 1 of a modified embodiment of a head-support structure.

FIGS. 1 to 3 show schematically a head-support structure according to the invention. It is the head support of a child seat for motor vehicles, which comprises a seat shell and backrest. According to FIGS. 1 to 3, the head support 10 is provided with lateral wings 11 projecting towards the front. A headrest 12 is disposed between the two lateral wings 11, in particular, in such a manner that its inclination relative to the backrest is adjustable. This adjustment is indicated by the double arrow 13 in FIG. 1 and by the arrow 14 in FIG. 3. Alternatively, the entire head support 10 could be mounted in a rotatable manner. In the case of the illustrated exemplary embodiment, however, only the headrest is rotatable, in particular, relative to the two lateral wings 11 and between an upright waking position extending approximately parallel to the backrest and a resting or sleeping position inclined towards the rear. In this context, reference is made to FIG. 4, in which these two positions of the headrest 12 are indicated as follows. The waking position is marked with the reference letter "W" and the resting or sleeping position is marked with the reference letter "S".

Figure 4:
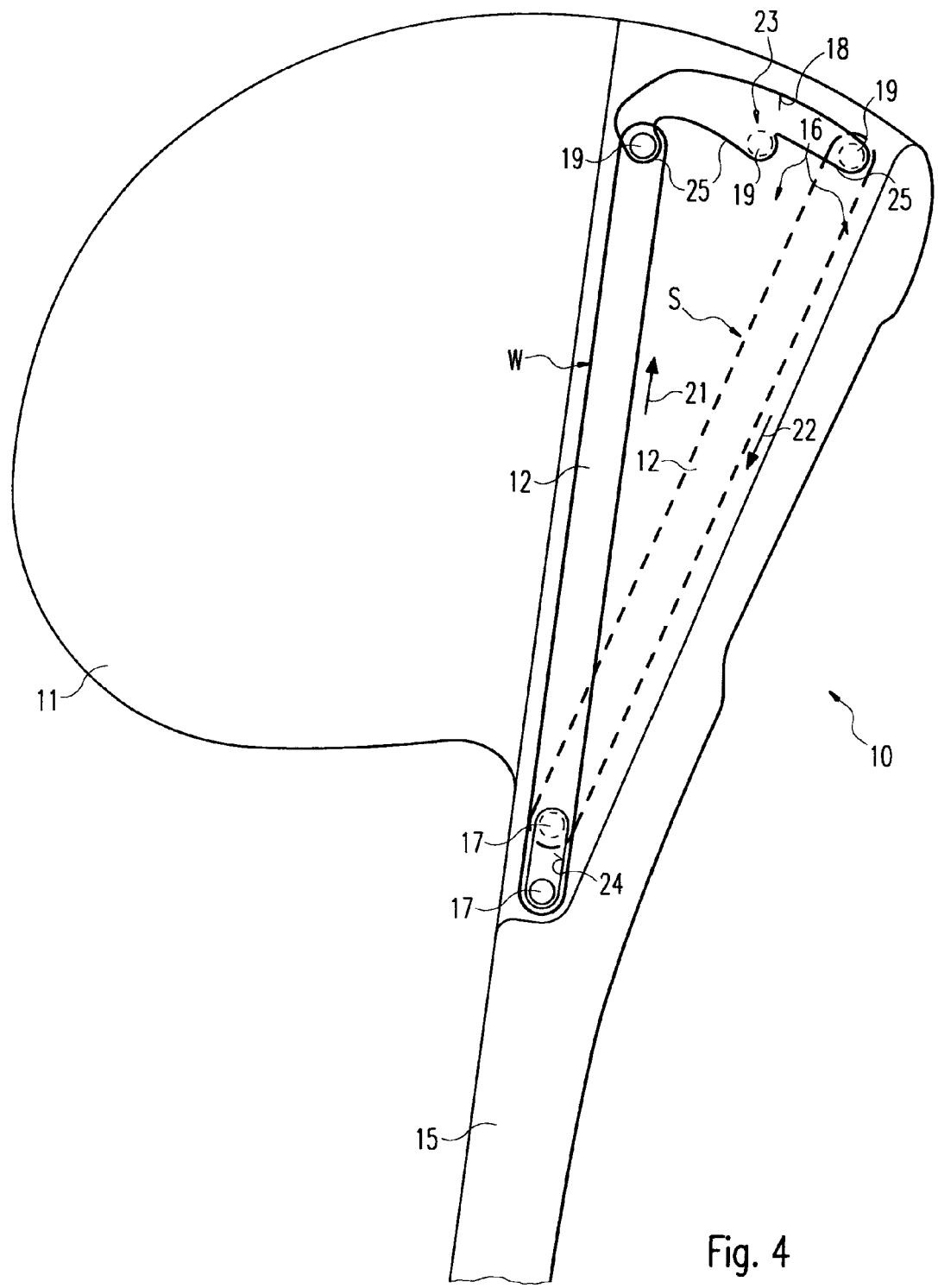
FIG. 4 shows in a schematic lateral view the principle of the head support according to the invention illustrating the rotational mechanism for a headrest disposed between the lateral wings of a head support.

The inclination of the headrest 12 can be adjusted either infinitely or, as shown in FIG. 4, stepwise.

It must be emphasized that the head support 10 is mounted in a height-adjustable manner on the backrest, which is not illustrated in greater detail here. For this purpose, the head support 10 is arranged at the upper end of a head-support holder 15 mounted in a height-adjustable manner on the backrest, which, in the embodiment illustrated in FIGS. 1 and 2 is designed in the form of a plank. Since the mechanism for the height-adjustment of the head support is not relevant to the present invention, this feature is not presented or described in greater detail here. However, a person skilled in the art will know how to design a height-adjustment of this kind. For this purpose, the plank-like head-support holder 15 must always be mounted in a displaceable manner within the backrest, preferably at the rear side of the same. Moreover, complementary locking mechanisms are provided, on the one hand, on the backrest and, on the other hand, on the head-support holder 15, in order to fix the head support at different heights relative to the seating surface of the child seat. To this extent, the child seat can be described as capable of "growing with the child".

In the embodiment shown in FIGS. 1 and 2, and also as shown in FIG. 3, the lateral wings 11 projecting towards the front are moulded at the upper end of the plank-like head-support holder 15. The lateral wings 11 therefore form an integral component of the head-support holder 15.

As shown in FIGS. 3 and 4, a wedge-shaped recess 16 is formed in the region between the two lateral wings 11, into which the headrest 12 disposed between the lateral wings 11 can be rotated (FIGS. 3 and 4). The lower end of the headrest 12 adjacent to the seat shell is mounted on the backrest, and/or in the present case, on the head-support holder 15, in a rotatable manner about a horizontal transverse axis 17. In the upper region of the headrest 12, means are provided for a hook-in connection at different tilting positions relative to the backrest and/or the head-support holder 15, as indicated in FIG. 4 by the reference numbers 18, 19.

Moreover, FIG. 4 shows that the headrest 12 together with the rotational bearing 17 can be raised, preferably against the action of a tension spring 20 (see FIGS. 1 and 2), so that on raising the headrest 12 in the direction of the arrow 21 in FIG. 4, the hook-in connection for a first tilting position, the waking position "W" in FIG. 4, can be released and the headrest 12 can be moved from this waking position into a second tilting position, the sleeping position "S" in FIG. 4 and can be locked in this position by lowering the headrest in the direction of the arrow 22, and vice versa. FIG. 4 also shows that the headrest 12 can be moved into an intermediate position 23 between the waking position and the sleeping position.

The embodiment presented also has the major advantage that in the case of sudden braking and/or a head-on collision, the headrest 12 automatically moves forward because of its mass inertia and is hooked into the waking position "W". Accordingly, the child's head is supported in the upright position when it is jolted backwards at the end of the braking procedure and/or collision. A whiplash trauma is therefore considerably reduced by comparison with a headrest, which is permanently inclined towards the rear and/or, as in the prior art, by comparison with a backrest inclined towards the rear with head support rigidly attached to it.

The rotational bearing 17 of the headrest 12 comprises two mounting pins projecting at both sides of the same or a continuous rotational axis, which projects beyond the latter at both sides of the headrest 12. These mounting pins 17 correspond with oblong retainers 24 disposed in the backrest or respectively, in the present case, in the head-support holder 15 and extending approximately parallel, to the backrest and/or to the head-support holder 15. In the upper region of the headrest 12, a positioning pin 19 projects laterally at least on one side, preferably on both sides of the same. These pins each correspond with a guide channel 18, each of which is formed on the mutually adjacent side of the lateral wing 11 (see also FIG. 3, where the guide channel is an integral component of the lateral wing, and indeed still within the region of the wedge-shaped recess 16). The guide channel 18 is curved to correspond to the circle of rotation of the headrest 12 about the rotational axis 17. Furthermore, the guide channel 18 provides at least two retaining slots 25, in the embodiment shown in FIGS. 3 and 4, three retaining slots 25, into which the positioning pins 19 can be inserted. In every case, two retaining slots 25 of this kind are provided, wherein the one defines the waking position and the other defines the sleeping position of the headrest 12. In the present case, an intermediate position 23 is defined by a middle retaining slot 25.

The above named head-support structure preferably consists of moulded foam parts, but preferably comprises synthetic material parts (e.g. polyethylene) manufactured using injection-moulding or blow-moulding processes. The individual parts can additionally be covered by upholstery or a fabric covering.

The wedge-shaped recess 16, into which the headrest 12 can be rotated, allows an angle of rotation of approximately 10° to 20°, especially approximately 15° to 17°.

As already explained with reference to FIG. 3, the guide channel 18 can be an integral component of the lateral wings or of the head-support 8 holder. Alternatively, it is also conceivable to provide the guide channel 18 as a separate component, especially made from metal. Corresponding guide catches are then inserted into corresponding lateral recesses in the lateral wings. In FIG. 2, a lateral recess of this kind for receiving a guide channel 18 is marked with the reference number 26.

A hand-grip recess, or a handle, which facilitates the lifting of the headrest 12 against the action of the spring 20, is preferably formed at the upper limiting edge of the headrest 12.

The above description shows that the head support can be rotated independently of the height of the head support relative to the seat surface of the child seat.

All of the features disclosed in the application documents are claimed as essential to the invention, in so far as they are novel either individually or in combination by comparison with the prior art.

REFERENCE MARKINGS

10 Head support
11 Lateral wing
12 Headrest
13 Double arrow
14 Arrow
15 Head-support holder
16 Recess
17 Transverse and/or rotational axis
18 Guide channel 19 Pin or positioning pin
20 Tension Spring
21 Arrow
22 Arrow
23 Intermediate position
24 Oblong retainer
25 Retaining slot
26 Recess
W=Waking position
R=Resting or sleeping position

What is claimed is:

1. Child seat for motor vehicles, with a seat shell and a backrest, at an upper end of the backrest is disposed a head support with lateral wings projecting forward, characterised in that a headrest disposed between the two lateral wings of the head support, is adjustable independent of and relative to the two lateral wings and to the backrest, between an upright waking position extending approximately parallel to the backrest and a resting or sleeping position inclined rearward relative to said backrest or a rest surface of the backrest, respectively.

2. Child seat according to claim 1, characterised in that the inclination of the headrest disposed between the two lateral wings of the same, can be adjusted either smoothly or stepwise.

3. Child seat according to claim 1, characterised in that the head support is mounted on the backrest in a height-adjustable manner.

4. Child seat according to claim 3, characterised in that the head support is disposed at an upper end of a head-support holder mounted in a height-adjustable manner at an upper end of the backrest.

5. Child seat according to claim 4, characterised in that the head-support holder is designed in a tubular manner or in the form of a plank.

6. Child seat according to claim 5, characterised in that the lateral wings projecting forward are moulded onto an upper end of the head-support holder, wherein a wedge-shaped recess, into which the headrest disposed between the lateral wings can be rotated, is formed in a region between these two lateral wings.

7. Child seat according to claim 6, characterised in that a lower end of the headrest adjacent to the seat shell is mounted in a rotatable manner about a horizontal, transverse axis, on the backrest or the head-support holder, while means are provided in an upper region of the headrest, for a hook-in connection in various tilting positions relative to the backrest or to the head-support holder.

8. Child seat according to claim 7, characterised in that the headrest, together with a rotational bearing, can be raised, in particular against the action of a resilient element, so that when the headrest is raised, the hook-in connection for a first tilting position of the same can be released, and the headrest can be moved into a second tilting position and can be hooked into the latter by lowering or vice versa.

9. Child seat according to claim 8, characterised in that the rotational bearing of the headrest comprises two bearing pins, which correspond with oblong retainers arranged in the backrest and/or in the head-support holder and extending approximately parallel to the backrest and/or head-support holder.

10. Child seat according to claim 9, wherein the means provided in an upper region of the headrest for a hook-in connection in various tilting positions are characterised in that a positioning pin projects laterally in an upper region of the headrest, on at least one side of the same, which positioning pin corresponds with a guide channel disposed in the backrest or in the head-support holder, which is designed in a curve corresponding to a circle of rotation of the headrest and which provides at least two retaining slots, one of which defines the waking position of the headrest and another of which defines the sleeping position of the headrest, and into which the positioning pins can optionally be inserted.

* * * * *